INVENTORS:
IZAAK HAVENAAR
FRANCISCUS H. MEYS
BY: *Martin R. Baer*
THEIR ATTORNEY United States Patent Office 3,294,166
Patented Dec. 27, 1966

3,294,166
CONSOLIDATING EARTH FORMATIONS
Izaak Havenaar, Oldenzaal, and Franciscus H. Meys, Rijswijk, Netherlands, assignors to Shell Oil Company, New York, N.Y., a corporation of New York
Filed Oct. 22, 1965, Ser. No. 507,983
Claims priority, application Great Britain, Jan. 25, 1962, 2,883/62
13 Claims. (Cl. 166—33)

This application is a continuation-in-part of our application Serial No. 209,675, filed July 13, 1962, now abandoned.

This invention relates to the treatment of earth formations and particularly of earth formations surrounding oil wells. More particularly it relates to methods of treating preferentially water wetted earth formations surrounding oil wells with epoxides to consolidate unconsolidated or substantially unconsolidated masses, such as loose sand surrounding oil wells and the like, while retaining substantial degree of permeability to oil therein.

A problem which is often encountered in the recovery of oil from underground formations is the presence of an unconsolidated formation material immediately surrounding the well borehole. It is known that the small sized particles of an unconsolidated formation, which are entrained in the fluid passing out of the formation into a production well communicating therewith, will cause increased abrasion of metal parts. This necessitates frequent clean-outs or replacement of production equipment, such as separators, pumps, valves and tanks. Coarser particles entrained in the fluid flowing into the well are deposited on the bottom of the well, reducing the rate of production because of the plugging effect caused by the increasing mass of particles accumulating therein. If the production rate is too low the well has to be bailed out before a new production cycle can begin. In some cases the particles enter the well in such great quantities that it is not possible to produce the well economically. These drawbacks can be overcome by consolidating the loose formation surrounding the well bore, which can be accomplished with plastics.

The problem of consolidating sand by means of plastics is complicated and difficult since the majority of the sands are water wet and their pores contain droplets of oil surrounded by the water which is in contact with the grains. Further, the connate water in the sands is usually alkaline, and basic mineral materials, such as carbonates, often comprise a significant portion of the naturally occurring cementing materials existing between the grains of the sand. In addition, the unconsolidated sands are encountered at widely varying depths and temperatures which range from about 90° F. to 350° F. Variations in the depth of these sands, as well as the variations in their permeability, and the variations in the size of tubing strings installed in the well all interact to create wide variations in the problems of consolidating with plastics, in formations requiring consolidation.

Further, one of the requirements of a good consolidation method is that it can be applied at the various temperatures which are to be expected in the formations. Further, it is required that the bond formed with the hardened resin between the particles or grains of the formation will be resistant to formation fluids and/or to chemicals injected into the formation, as well as to movements in the neighboring unconsolidated parts of the formation. On the other hand, the amount of resin required to give the formation the necessary mechanical strength should not excessively impair the permeability thereof so that a flow of fluids from the formation to the well, or vice versa, will be possible. This is of utmost importance when consolidating formations having a low permeability.

This invention meets many of the requirements for a good sand consolidation with plastics and provides an improved method of sand consolidation over the methods of sand consolidation by means of various plastics as set out, for example, in U.S. Patents 2,476,015, 2,573,690, 2,604,172, 2,674,322; Venezuelan Patent 10,747 and Netherlands Patent 98,581.

The method according to the present invention may be used in treatment of formations surrounding injection wells or production wells. It may also be used in consolidating formations surrounding mine-shafts or in consolidating subsoil for foundation purposes.

The objects of this invention include the following:

To provide an improved method for treating a porous earth formation by causing the grains thereof to be bonded together with a thin layer of an amine cured epoxy resin;

To provide an improved method for treating a water wetted porous earth formation with a solution which deposits a resin on the grains of said formation;

To provide an improved method for treating an earth formation surrounding a borehole with a solution of a resin which separates from said solution and coats the grains of said formation, and which is capable of being adjusted to accommodate wide variations in the temperature, permeability, depth of the formation, and tubing arrangements in said borehole;

To provide a method of treating a water wetted earth formation by depositing on the grains thereof from solution partially cured resins which are capable of preferentially wetting surfaces of said grains;

To provide an improved method for consolidating unconsolidated or substantially unconsolidated earth formations;

To provide a sand consolidation treatment which consolidates an unconsolidated earth formation by means of a resinous cementing material which is substantially unaffected by the chemical properties of the mineral components of the sand and which in its cured condition is not substantially attacked by fluids passing through said formations;

To provide a method which permits substantial prolonging of the producing life of oil wells producing through an unconsolidated formation;

To provide an improved method for injecting a solution of an epoxy resin and an amine curing agent into a formation surrounding a borehole.

These and other objects of this invention will be understood from the following description, taken with reference to the attached drawing wherein.

The method according to the present invention comprises preparing a solution of an epoxy resin having more than one vicinal epoxy group per molecule and an amine capable of acting as curing agent for said epoxy resin, in a special liquid solvent vehicle which also has preferential solubility for the intermediate resin product so as to keep dissolved the amount of intermediate resin product formed during the time required to pump said solution into an earth formation to be treated and yet will cause the resin product to separate from the solvent after the solution is spotted in the reservoir and injecting the solution into the reservoir. The total amount of epoxy resin and curing agent in solution can be between 3 and 50 volume percent of the solution and the viscosity of the solution should be below 100 centipoises at formation temperature. While 3 to 50% by volume of resin components (polyepoxides and amines) in the solution represents the maximum limits, as you approach either extreme the value of the consolidation obtained with this invention becomes questionable. At about 3% by volume of resin components the process gives only a slight increase in compressive strength of consolidated mass and at 50% and above the permeability of the consolidated mass is manifestly reduced, a 75% or more reduction in permeability. Thus on the more practical level, the resin components in the solution should be between 5 and 30% by volume of the solution and probably between about 5 and 25% or even 20% where appreciable permeability is desired. Also, these lower ranges of resin components also reduce the costs of the process since the resin components are quite expensive. Of course, viscosity control of the solution containing the resin components is easier in these lower ranges as well.

A suitable solvent for the practice of the invention is a liquid mixture of aromatic and non-aromatic hydrocarbons containing sufficient aromatics to maintain the ungelled intermediate resin product in solution while transmitting the solution to the earth formation. The epoxy resin and curing agent start to react in solution, at the temperature conditions encountered at the time they are mixed forming the intermediate resinous reaction product which must have an initial solubility in the solution, yet have the capability of separating from said solution after the solution is spotted in the formation. The separated, partially cured, ungelled resin accumulates on the sand grains and after further curing it is capable of bonding unconsolidated sand grains together as a strong, consolidated unit. Earth formations can be consolidated in this invention while retaining a substantial degree of their original permeability.

Since this invention is especially useful in the consolidation of unconsolidated sand formations surrounding the boreholes of oil wells, the description of the invention will be largely directed to sand consolidation process applicable to oil wells.

Tests of the porosity and permeability of the formation to be treated permit estimation of the amount of surface area of the portion of the formation to be contacted with the solution. Further, the concentration of the resin components (the epoxy compound, curing agent, and promoter) per total solvent is selected to form a solution containing from 3 to 50, preferably from about 5 to about 20 percent by volume of resin components, which is generally sufficient to coat substantially all of the surface area in the portion of formation to be impregnated by the solution.

The time which is required to inject solutions into the formation, the formation temperature, and the shut-in period which is desirable after the treatment all control the rate at which the resin should react; the resin components are selected to react at a suitable rate and preferably to provide an excess of an amine having the property of preferentially wetting the surfaces of earth formation materials.

The selected resin components are preferably dissolved in the selected concentration in a mixed solvent containing aromatic and aliphatic components in a ratio selected to provide a solution which remains substantially miscible until it enters the formation and then separates into a solvent phase and an immiscible liquid phase which contains the partially cured resin and preferentially wets the surfaces of the grains. Without the mixed solvents, the solution tends to gel, plugging the formation.

One of the advantages of this invention over the use of phenolic resins for the consolidation of earth formations is that all reactants required to produce the resinous cement are present in a single batch of liquid. Thus, all reactants used to produce the desired plastic bonding of the said grains, the epoxy resin and an amine curing agent are present in the proper amounts.

A particular desirable aspect of this invention is that an amine is employed which serves not only as curing agent but also has the property of imparting surfactant characteristics to the partially cured resin which precipitates from solution, causing said resin to preferentially adhere to grains of the formation even when the earth formation is a preferentially water-wetted one from which connate water has been displaced in the manner to be described hereinafter. The amine is preferably employed in at least 5% molar excess over the amount stoichiometrically required to react with all the epoxy groups of the uncured epoxy resin.

If precipitated resin is present in the solution when it reaches the formation, it would tend to cause undesired plugging or flow restriction in the formation. It is, therefore, an important aspect of the process of this invention that the resin solution is prepared in a controlled manner to prevent any precipitation of resin prior to the time it is completely injected into the formation to be treated. This is accomplished by selecting the type and concentration of solvent, resin, curing agent and promoter in a manner described hereinafter in greater detail, and by preventing contact of the resin solution, prior to injection into the formation, with materials which would precipitate resin from the solution.

A significant distinctive characteristic of this invention is the property of the treating solution of this invention that it retains partially cured epoxide amine resin product in solution until the treating composition is placed in the formation, and thereafter permits partially cured product to separate as a viscous, insoluble liquid phase which preferentially wets sand grains. Solutions of other resins and/or solutions of epoxy resins with curing agents tend to form gels at such a stage of partial curing if the special mixed solvent described above is not used. Gels do not selectively wet the grains of the formation and cause a treated formation to loose the major proportion of its original permeability to oil. Also, formations treated according to this invention, in which resin cementing takes place at the contact points of the individual grains of the formation, are stronger than similar formations treated by other methods.

COMPONENTS USED IN THE TREATING PROCESS

Solvents

The special solvents in which the epoxy resin and curing agent are dissolved to prepare the resin solutions of this invention are hydrocarbon solvents containing a substantial proportion of aromatic hydrocarbons, preferably at least 50% by volume. The solvent is a mixture of aromatic hydrocarbon and other saturated hydrocarbons. Suitable aromatic hydrocarbons are benzene or derivatives thereof, e.g. alkyl benzenes such as toluene, xylenes and the like. Other suitable aromatic hydrocarbons are those obtained by extraction of aromatics from kerosene, gas oil, spindle oil, lubricating oil or heavy catalytically cracked cycle oil. A particularly useful solvent for use in this invention is a kerosene extract boiling in the range from 350° to 510° F., e.g., an SO$_2$ extract of kerosene having an API gravity of 25–28°, an initial boiling point between 350 and 390° F., an end point between 450 and 510° F., and an aromatic content of at least about 80% by weight, the remainder being saturated non-aromatic hydrocarbons. As explained in more detail hereinafter, the hydrocarbon solution is prepared from an aromatic solvent and hydrocarbon containing a greater proportion of non-aromatics, e.g., unextracted kerosenes, gas oils or the like. In general, oils boiling above 175°, and preferably between 350° and 650° F. are employed as solvents used herein.

Aromatics are good solvents for polyepoxides but have the drawback of forming gel when polyepoxides and curing agents are dissolved therein. Gel formation is completely unacceptable where it is desired that the permeability of the formation to be consolidated be maintained. Therefore, through the use of the mixture of the aromatic and non-aromatic hydrocarbons, as described above, it is possible to dissolve the polyepoxide and amine in the solvent and yet avoid the gel formation. While the non-aromatic hydrocarbons discussed above show little solubility for polyepoxides their mixture with aromatic hydrocarbons overcomes this problem. Likewise, the presence of the non-aromatics avoids the gel formation experienced when aromatics are used alone.

As mentioned above the aromatic hydrocarbon content should be at least 50% by volume and, of course, since its presence affects the solubility of the polyepoxide, it is usually desirable to use a greater percentage of aromatics in the higher concentrations of resins.

Polyepoxides

The polyepoxides used in the process of the invention comprise those organic materials possessing more than one vic-epoxy group, i.e., more than one group per molecule. These materials may be saturated or unsaturated, aliphatic, cycloaliphatic, aromatic or heterocyclic.

For clarity, many of the polyepoxides and particularly those of the polymeric type will be described in terms of epoxy equivalent value, which refers to the number of epoxy groups contained in the average molecule. The meaning of this expression is described in U.S. 2,633,458.

If the polyepoxide consists of a single compound and all of the epoxy groups are intact, the epoxy equivalency will be integers, such as 2, 3, 4 and the like. However, in the case of polymeric type polyepoxides many of the materials may contain some of the monomeric monoepoxides or have some of their epoxy groups hydrated or otherwise reacted and/or containing macromolecules of somewhat different molecular weight so that epoxy equivalent values may be quite low and contain fractional values. The polymeric material, may, for example, have epoxy equivalent values, such as 1.5, 1.8, 2.5 and the like.

Examples of the polyepoxides include, among others, 1,4 - bis(2,3 - epoxypropoxy)benzene, 1,3 - bis(2,3-epoxypropoxy)benzene, 1,4′ - bis(2,3 - epoxypropoxy)diphenyl ether, 1,8 - bis(2,3 - epoxypropoxy)octane, 1,4 - bis(2,3-epoxypropoxy)cyclohexane, 4,4′ - bis(2 - methoxy - 3,4-epoxybutoxy)diphenyl dimethylmethane, 1,3 - bis(4,5-epoxypentoxy) - 5 - chlorobenzene, 1,4 - bis(3,4-epoxybutoxy) - 2 - chlorocyclohexane, 1,3 - bis(2 - methoxy-3,4 - epoxybutoxy)benzene, and 1,4 - bis(2 - methoxy-4,5-epoxypentoxy)benzene.

Other examples include the epoxy polyethers of polyhydric phenols obtained by reacting a polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl) propane (Bisphenol A), 2,2-bis(4-hydroxyphenyl)butane, 4,4′-dihydroxybenzophenone, bis(4 - hydroxyphenyl)ethane, 2,2-bis(4-hydroxyphenyl)pentane, and 1,4-dihydroxynaphthalene. The halogen-containing epoxides may be further exemplified by 3 - chloro - 1,2 - epoxybutane, 3-bromo-1,2-epoxyhexane, 3-chloro-1,2-epoxyoctane, and the like.

The monomer products produced by this method from dihydric phenols and epichlorohydrin may be represented by the general formula wherein R represents a divalent hydrocarbon radical of the dihydric phenol. The polymeric products will generally not be a single simple molecule but will be a complex mixture of glycidyl polyethers of the general formula wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number as noted above.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess, to the epichlorohydrin. The reaction is preferably accomplished at temperatures within the range of from 50° C. to 150° C. The heating is continued for several hours to effect the reaction and the product is then washed free of salt and base.

Particularly preferred glycidyl ether products are those products of the type of Polyether A, described below, which have a molecular weight of 350 to 400 and an average of 1.85 vic-epoxy groups per molecule.

The preperation of some of the glycidyl polyethers of dihydric phenols will be illustrated below. Unless otherwise specified, parts indicated are parts by weight.

PREPARATION OF GLYCIDYL POLYETHERS OF DIHYDRIC PHENOLS

Polyether A 1 mol of bisphenol is dissolved in 10 mols of epichlorohydrin and 1 to 2% water added to the resulting mixture. 5% by weight phenol is added to the mixture. The combined mixture is then placed in a kettle provided with heating and cooling means, agitator, distillation condenser and receiver. The mixture is brought to 80° C. and 2 mols of solid sodium hydroxide added in small portions. Sufficient cooling is applied during the addition so that the temperature is maintained at about 95–97° C. and there is a gentle distillation of epichlorhydrin and water. After the last addition of sodium hydroxide with the completion of the reaction, the excess epichlorhydrin is removed by vacuum distillation. After completion of the distillation, the residue is cooled to about 90° C. and about 300 parts of benzene added. Cooling drops the temperature of the mixture to about 40° C. with precipitation of salt from the solution. The salt is removed by filtration and the removed salt carefully washed with about an additional 300 parts of benzene to remove polyether therefrom. The two benzene solutions are combined and distilled to separate the benzene. When the kettle temperature reaches 125° C., vacuum is applied and distillation. The resulting product is a liquid composition containing glycidyl polyether of bisphenol having the following properties: Epoxy value of 0.541 eq./100 g., color 6 (Gardner), chlorine (percent w.) 0.24, viscosity 70 poises.

Polyether B

A solution consisting of 11.7 parts of water, 1.22 parts of sodium hydroxide, and 13.38 parts of 2,2-bis(4-hydroxyphenyl)propane is prepared by heating the mixture of ingredients to 70° C. and then cooling to 46° C. at which temperature 14.06 parts of epichlorohydrin is added while agitating the mixture. After 25 minutes, there is added during an additional 15 minutes time a solution consisting of 5.62 parts of sodium hydroxide in 11.7 parts of water. This causes the temperature to rise to 63° C. Washing with water at a temperature of 20° C. to 30° C. is started 30 minutes later and continued for 4½ hours. The product is dried by heating to a final temperature of 140° C. in 80 minutes, and cooled rapidly. At room temperature, the product is an extremely viscous semi-solid having a melting point of 27° C. by Durran's Mercury Method and a molecular weight of 483. The product has an epoxy value eq./100 g. of 0.40. For convenience, this product will be referred to as Polyether B.

Preferred members of the above-described group of polyepoxides are the glycidyl polyethers of the dihydric phenols, and especially 2,2-bis(4-hydroxyphenyl)propane, having an epoxy equivalency between 1.0 and 2.0, a molecular weight between 250 and 900, and preferably a Durran's Mercury Method softening point no greater than 30° C. Most preferred are the normally liquid products having a molecular weight of about 350 to 400 and an epoxy equivalent of about 1.85.

The glycidyl polyethers of polyhydric phenols obtained by condensing the polyhydric phenols with epichlorohydrin as described above are also referred to as "ethoxyline" resins. See Chemical Week, Vol. 69, page 27, for September 8, 1951.

Another group of polyepoxides that may be used comprises the glycidyl ethers of novolak resins, which resins are obtained by condensing an aldehyde with a polyhydric phenol. Typical members of this class are the epoxy resins from formaldehyde 2,2 - bis(4 - hydroxyphenyl)propane novolak resin.

Amine curing agents

The curing agents to be used to combine with the above-described polyepoxides in the process of the present invention are amines which act both as a surface active material to impart preferential wetting properties to the resin solution and the partially cured resin products, and as a curing agent to convert the polyepoxide to an insoluble infusible form. Preferred materials includes those organic materials possessing a plurality of amino hydrogen groups, i.e., a plurality of groups, wherein N is an amino nitrogen. These include the aliphatic, cycloaliphatic, aromatic or heterocyclic polyamines as well as derivatives thereof as long as the derivative still contains the necessary amino hydrogen.

Especially preferred for use in this invention are the polyamines possessing one or more cycloaliphatic rings, such as, for example, 1-cyclohexylamino-3-aminopropane, 1,4-diaminocyclohexane, 1,3-diaminocyclopentane, bis(3-methyl-4-aminocyclohexyl)methane, bis(4-aminocyclohexyl)methane, di(aminocyclohexyl)sulfone, 1,3-di(aminocyclohexyl)propane, 4-isopropyl-1,2-diaminocyclohexane, 2,4 - diaminocyclohexane, N,N'-diethyl-1,4-diaminocyclohexane, and the like. Preferred members of this group comprise those polyamines having at least one amino or alkyl-substituted amino group attached directly to a cycloaliphatic ring containing from 5 to 7 carbon atoms.

Also, especially suitable are hydrogenated primary and secondary aromatic polyamines having at least two amino hydrogens, at least 50% of their aromatic structure having been converted to cycloaliphatic structure during hydrogenation. These cycloaliphatic amines are preferably obtained by hydrogenating the corresponding aromatic amine. Thus, di(aminocyclohexyl)methane is obtained by hydrogenating methylene dianiline. Use of these amines is described in further detail in U.S. 2,817,644 to Shokal et al., the pertinent disclosures of which are incorporated herein by reference. These amines are preferred because they react rather slowly with the preferred epoxides in the hydrocarbon solutions used in this invention and thus provide ample time for the solution to be pumped into the earth formation to be treated, even in deep wells and those most resistant to injection of fluid.

Coming under special consideration, particulaly because of the better control over the rate of cure at relatively high temperatures, are the aromatic polyamines, such as 1,3-diaminobenzene, 1,4 - diaminobenzene, 4,4'-diaminodiphenyl, 1 - phenylamino-3-aminopropane, di(2-aminophenyl)methane, di(4-aminophenyl)methane, di(3-methyl-4-aminophenyl)methane and di(4-aminophenyl)sulfone.

Other amines include, among others, the aliphatic polyamines, such as, for example, ethylene diamine, propylene diamine, hexylene diamine, diethylene triamine, triethylene tetramine, tetraethylene pentamine, 1,4-aminobutane, 1,3 - diaminobutane, hexamethylene diamine, 3-(N - isopropylamino)propylamine, N,N' - diethyl-1,3 - propanediamine, hexapropylene heptamine, penta(1 - methylpropylene)hexamine, tetrabutylenepentamine, hexa(1,1 - dimethylethylene)heptamine, di-(1 - methylbutylene)triamine, pentaamylhexamine, tri(1,2,2 - trimethylethylene)tetramine, tetra(1,3-dimethylpropylene)pentamine, penta(1,5 - dimethylamylene)hexamine, penta(1,2 - dimethyl-1-isopropylethylene)hexamine and N,N'-dibutyl-1,6-hexanediamine.

Aliphatic polyamines coming under special consideration are the alkylene polyamines of the formula wherein R is an alkylene radical, or a hydrocarbon substituted alkylene radical, and n is an integer of at least one, there being no upper limit to the number of alkylene groups in the molecule.

Within this group of aliphatic polyamines are the polyethylene polyamines of the formula wherein n is an integer varying from about 2 to 8 which are very useful in the practice of this invention. Specifically useful are the polyethylene polyamines comprising 20–80% by weight of polyethylene polyamines having average molecular weights in the range of 200–500. These high moleculor weight polyethylene polyamines normally start with tetraethylene pentamine and related higher polymers which increase in complexity with increasing molecular weights. The remaining 80-20% of the mixture is diethylene triamine employed in such proportions that the mixture is fluid at about room temperature (60–90° F.).

The mixture of high molecular weight polyethylene polyamines is normally obtained as a bottom product in the process for the preparation of ethylene diamine. Consequently, it normally constitutes a highly complex mixture and even may include small amounts (less than about 3% by weight) of oxygenated materials. A typical mixture of polyethylene polyamines diluted with about 25% diethylene triamine has the following analysis:

Percent by weight
Carbon _______________________________ 51.5
Nitrogen ______________________________ 34.3
Hydrogen _____________________________ 11.6
Oxygen _______________________________ 2.5 total basicity, equivalents per 100 grams=1.98, equivalent to 27.7% nitrogen.

Active nitrogen ___________________percent__ 81
Viscosity _____________________________poises __ 75–250
Equivalent weight __________________ 42.5 to 47.5

Another group of material that may be used in process of the invention comprise the organo-metallic compounds, usch as those having a silicon or boron atom or atoms linked to amino or substituted amino groups. The compounds may also be those organo-metallic compounds wherein the amino group or substituted amino group or groups are attached to carbon, such as in the alkoxysilylpropylamines as triethoxysilylpropylamines.

Still another group comprise the aminoalkyl-substituted aromatic compounds, such as, for example, diaminoethyl)benzene, di(aminomethyl)benzene, tri-(aminobutyl)naphthalen and the like.

Still another group comprise the polymeric polyamines, such as may be obtained by polymerizing or copolymerizing unsaturated amines, such as allyl amine or diallyl amine, alone or with other ethylenically unsaturated compounds. Alternatively, such polymeric products may also be obtained by forming polymers or copolymers having groups reactive with amines, such as, for example, aldehyde groups, as present on acrolein and methacrolein polymers, and reacting these materials with monomeric amines to form the new polymeric polyamines. Still other polymeric amines can be formed by preparing polymers containing ester groups, such as, for example, a copolymer of octadecene-1, and methyl acrylate, and then reacting this with a polyamine so as to effect an exchange of an ester group for an amide group and leave the other amine group or groups free. Polymers of this type are described in U.S. 2,912,416.

Still other materials include the N-(aminoalkyl)piperazines, such as, for example, N-aminobutylpiperazine, N-aminoisopropyl - 3-butoxypiperazone, N-aminoethylpiperazine, 2,5-dibutyl-N-aminoethylpiperazine, 2,5 - dioctyl-N-aminoisobutylpiperazine and the like. Coming under special consideration are the N-(aminoalkyl)piperazines wherein the alkyl group in the aminoalkyl portion of the molecule contains no more than 6 carbon atoms, and the total molecule contains no more than 18 carbon atoms.

Coming under special consideration, particularly because of the better control over the rate of cure obtained, are the acetone soluble derivatives of the above polyamines as may be obtained by reacting the above-described polyamines with other materials to remove some but not all of the active amino hydrogen.

A group of such materials include those acetone soluble products obtained by reacting the polyamines with a monoepoxide. Examples of these reactants include, among others, ethylene oxide, propylene oxide, styrene oxide, phenyl glycidyl ether, allyl glycidyl ether, octadecyl glycidyl ether, tolyl glycidyl ether, chorophenyl glycidyl ether, naphthy glycidyl ether, diacetate of monoglycidyl ether of glycerol, dipropionate of the monoglycidyl ether of glycerol, epichlorohydrin, 1,2-decylene oxide, glycidyl acetate, glycidyl benzoate, glycidyl propionate, glycidyl acrylate, glycidyl methyl maleate, glycidyl stearate, glycidyl oleate, butyl 1,2-epoxypropionate and the like.

This reaction between the polyamines and monoepoxide is effected by merely bringing the components together in proper proportions. The adducts are obtained when a mole of the polyamine is reacted with not more than one mol of monoepoxide. The excess amine can be retained or removed by distillation. Examples of the monoepoxide-polyamine reaction products include, among others, N(hydroxypropyl)diethylene triamine (reaction product of propylene oxide and diethylene triamine) and N(2-hydroxy-4-phenoxypropyl)diethylene triamine (reaction product of phenyl glycidyl ether and diethylene triamine).

A group of related materials are those soluble fusible products obtained by reacting a polyepoxide with a monoamine. Examples of polyepoxides that may be used include any of those noted above for use according to the present invention. Examples of the monoamines include, among others, secondary amines as dimethylamine, diethylamine, dipropylamine, dibutylamine, di(tert-butyl)-amine, dinonylamine, dicyclohexylamine, diallylamine, dibenzylamine, methylethylamine, ethylcyclohexylamine, and the like. This reaction between the polyepoxides and monoamines is effected by merely bringing the components together in proper proportions. The desired soluble fusible products are obtained when the polyepoxide and monoamine are combined so as to have at least 1.5 mols of the amine per epoxide equivalent of the polyepoxide.

Another group of derivatives that may be used in the process of the invention include those soluble and fusible products obtained by reacting the polyamines noted above with unsaturated nitriles, such as, acrylonitrile. Examples of such products include the cyanoethylated diethylene triamine, cyanoethylated triethylene tetramine, cyanoethylated hexamethylene diamine, cyanoethylated 1,3-propanediamine and cyanoethylated 1,3-diaminocyclohexane. Preferred species of the cyanoalkylated polyamines include those of the formula wherein x represents an integer in the range of 0 through 3 and A and A' represent a member selected from the group consisting of hydrogen and cyanoethyl radicals, and further characterized in that the amine has at least one cyanoethyl group and at least one non-tertiary amino group in the molecule. Especially preferred members of this group comprises the cyanoethylated aliphatic and cycloaliphatic polyamines containing up to 18 carbon atoms.

Other suitable materials include the imidazoline compounds as prepared by reacting monocarboxylic acids with polyamines. These may be represented by the formula wherein X is an organic radical, and preferably an alkylene radical, R' is a long chain hydrocarbon radical, and preferbly one containing at least 12 carbon atoms, and R is an organic radical containing an amine or amine substituted group. Particularly preferred members of this group are those obtained by reacting any of the above-described polyamines with long chain monocarboxylic acids, such as those containing at least 12 and preferably 16 to 30 carbon atoms, such as, for example, palmitic acid, pentadecanoic acid, 4-ketomyristic acid, 8,10-dibromostearic acid, margaric acid, stearic acid, alpha-chlorostearic acid, linoleic acid, oleic acid, dihydroxystearic acid, arachidic acid, cluopanodonic acid, behennic acid, lignoceric acid, cerotic acid, montanic acid, melissic acid, and the like, and mixtures thereof. These imidazolines are prepared by heating the polyamine with the monocarboxylic acid and removing the water formed by the reaction. The acid and polyamine are combined in an equivalent ratio varying from about .3 to .7 to 1, and preferably about .3 to .5 to 1. The temperature employed preferably varies from about 100° C. to 250° C.

Still other examples include the sulfur and/or phosphorus-containing polyamines, such as may be obtained by reacting a mercaptan or phosphine containing active hydrogen with an epoxy halide to form a halo-hydrin, dehydrochlorinating and then reacting the resulting compound with a polyamine. N-(3-ethylthio-2-hydroxypropyl) diethylene triamine may be prepared, for example, by reacting ethyl mercaptan with epichlorohydrin, dehydrochlorinating and then reacting the resulting epoxy compound with diethylene triamine. Suitable examples of such compounds include, among others, N-(3-butylthio-2-hydroxypropyl) triethylene tetramine, N-(4-phenylthio-3-hydroxybutyl) pentamethylene tetramine, N-(4-cyclohexythio-3-hydroxybutyl) ethylene diamine, N-(3-cyclohexylthio-2-hydroxypropyl) hexamethylene diamine, N-(3-diphenylphosphino-2-hydroxypropyl)triethylene tetraamine, N-(3 - dicyclohexylphosphino-2-hydroxypropyl) pentamethylene tetramine, N-(3-didodecylphosphino-3-hydroxyhexyl)diethylene triamine, and 3-(allylthio-2-hydroxypropyl)hexamethylene diamine. Coming under special consideration are the N(alkylthiohydroxyalkyl)aliphatic and aromatic polyamines, the N-(cycloalkylthiohydroxyalkyl) aliphatic and aromatic polyamines, and the N-(arylthiohydroxyalkyl) aliphatic and aromatic polyamines. Preferred phosphorus-containing curing agents include the N-(dialkylphosphinohydroxyalkyl) aliphatic and aromatic polyamines, the N-(dicycloalkylphosphinohydroxyalkyl) aliphatic and aromatic polyamines and the N-(diarylphosphinohydroxyalkyl) aliphatic and aromatic polyamines.

Still other derivatives that may be employed include those obtained by reacting the polyamines with acrylates, such as methyl acrylate, ethyl acrylate, methyl methacrylate and the like. In this case there is an exchange of the ester linkage for an amide linkage, one of the polyamine nitrogens being involved in the said amide linkage.

Particularly suitable polyamines and derivatives to be used with the above-described polyepoxide whose relatively long curing time is not a critical requirement comprise the aliphatic and cycloaliphatic polyamines of the formula wherein $x$ is an integer of 0 to 10 and R is a bivalent aliphatic or cyclo aliphatic hydrocarbon radical containing from 1 to 10 carbon atoms, and derivatives obtained by reacting the aforedescribed polyamines with monoepoxides containing from 2 to 10 carbon atoms, ethylenically unsaturated mononitriles containing 1 to 6 carbon atoms and monocarboxylic acids containing up to 20 carbon atoms.

Cure accelerators

Among the numerous amines and polyepoxides listed above as being suitable for use in the process of this invention, selected polyamines and polyepoxides can be found which will react at a rate so that any desired interval between preparation of the mixture and first precipitation of partially cured product from the solution can be obtained. However, it is often advantageous to use a cure accelerator or promoter to control the reaction rate. The use of promoters to accelerate the curing reaction between polyepoxides and amines is known and among the preferred cure accelerators are phenolic compounds and tertiary amines. Particularly preferred are phenol and tridimethyl aminomethyl phenol. Other phenolic compounds, e.g., alkyl-substituted phenols, dihyric benzene and the like, may also be used. For a reaction mixture of a given polyepoxide and a given curving agent the amount of cure accelerator can be selected to provide a desired interval between mixing and first separation of partially cured product from solution, as illustrated later.

Crude oil displacing fluid

When consolidating or treating an oil-bearing formation, a typical processing sequence is initiated by injection into the formation of a fluid in which the crude oil is soluble. A diesel oil may be used where the crude is completely soluble in it. A 50:50 mixture of diesel oil and kerosene extract may be suitable where the crude is not soluble in diesel oil alone.

Water displacing fluids

When consolidating part of an underground formation which contains connate water, it is desirable to remove the connate water before injecting resin solution into the formation. Several types of water removing fluids may be employed for flushing connate water from a formation, for example, the water-removing fluid may be an oil solution of a surfactant. A preferred surfactant for this purpose has the formula $R-NH-(CH_2)_3-NH_2$, wherein R is an alkyl group derived from coconut oil, soya oil or tallow.

Other suitable water-removing fluids are organic liquids, such as hydrocarbon-oxygen compounds having less than 6 C-atoms per molecule and containing at least one keto-oxygen group and/or hydroxyl group. Suitable members are acetone, methyl ethyl ketone, isopropyl alcohol, n-propyl alcohol, sec. butyl alcohol, and the like.

Spacer fluids

In general the fluids suitable as water-removing fluids as pointed out above tend to interact with epoxy resin solution injected into the formation often causing the solution to form a gel. It is therefore essential that contact of these fluids within the formation be prevented. This is accomplished by using a spacer fluid between the water removing fluid and the hydrocarbon solution of epoxy resin and curing agents. Of course, the formation of gel in the formation will prevent effective consolidation of the formation and often will plug the formation.

In order to prevent untimely precipitation of epoxy resin, the spacer fluid is soluble in the resin solution and non-reactive with the ingredients thereof. Further, the spacer fluid should be mutually soluble with the water removing fluid in order to effectively drive water removing fluid containing connate water from the part of the formation to be consolidated. Suitable spacer fluids are, in general, hydrocarbons having the same composition as the hydrocarbons employed as solvents for the epoxy resin. However, the high aromatics contents which is desirable in the hydrocarbon solvent of the epoxy resin are not necessary in the spacer fluid and possibly undesirable. It may often be advantageous to prepare a solution containing, for example, 10 to 90 parts, and suitably 50 parts, of a kerosene extract having 80% aromatics, made up to 100 parts with an essentially non-aromatic diesel oil.

In general, the selection of the spacer fluid is made to provide a relatively inexpensive hydrocarbon liquid having the desired viscosity characteristics, capable of dissolving the water removal fluid to be employed, and capable of being dissolved in the hydrocarbon solution of epoxy resin and curing agent without causing precipitation of the resin therefrom.

ILLUSTRATIVE EXAMPLES

As the rate at which the epoxy compound reacts with the curing agent varies with temperature, the period required to inject a solution containing the epoxy compound and the curing agent from the top of a well to the formation to be consolidated and the rate at which solution can be injected into said formation are very important factors to be considered in practicing the invention. The period of time from mixing of the resin solution to the time the separation of the intermediate resinous product out of the solution has to be controllable within wide limits so that, on the one hand, in deep wells no separation of resin will take place before the solution has entered into the formation (which would result in a plugging of the wall of the formation), and on the other hand, when consolidating formations which are at a shallow depth not too much time will be lost before the consolidation is accomplished.

Preferably tests are carried out to find out the percentages of epoxy compound, curing agent, solvent and promoter (for controlling the reaction rate) which will give the best results under the conditions (e.g., temperature, depth, porosity) in the formation to be consolidated.

Examples of the effect of temperature on solutions containing 12 vol. % of polyether A, supra, in aromatic solvent containing about 81% aromatics by volume (boiling between 370° and 510° F. and having an API gravity of 28°) with various curing agents, are shown in Table 1.

For various curing agents in Table 1, the volume ratio of curing agent to polyether A is an optimum for compressive strengths that can be obtained when consolidating said packs having a mean particle size of 0.2 millimeter. For these volume ratios, the initial resin separation time, i.e., the period of time elapsing between the moment of preparation of the solution and the moment at which the first droplets of resin separate from this solution, has been determined at various temperatures. As can be seen, the initial resin separation time is greatly influenced by the temperature.

TABLE 1

| Curing Agent | Volume ratio curing agent/ polyether A giving optimum compr. strength | Initial resin separation time (in hours) | | |
|---|---|---|---|---|
| | | At 40° C. | At 60° C. | At 80° C. |
| N-aminoethyl-piperazine | 0.2 | 0.67 | | |
| Propylene-diamine | 0.3 | 1.9 | | |
| Mixture of bis(4-aminocyclohexyl)methane and 1-cyclohexylamino-3-aminopropane | 0.4 | 8 | 7.1 | 3.8 |
| 1-cyclohexylamino-3-aminopropane | 0.3 | 16 | 8 | 4.1 |
| Bis(3-methyl-4-aminocyclohexyl)methane | 0.5 | 24 | 10 | 6 |

As will be clear from Table 1, the initial resin separation time is less at the higher temperatures. Further, as for a certain temperature there will be found various values for the initial resin separation time when using various curing agents. It will be apparent that for each combination of depth and temperature a curing agent can be selected which, under the prevailing conditions, will give an initial resin separation time which is sufficiently long to ensure the injection of the solution containing the mixture of epoxy compound and curing agent down into the formatiton without any separation of resin.

It may be a drawback to have a fairly large number of curing agents in stock to control the separation time. However, a convenient alternative is to use a single curing agent and to control the initial resin separation time by means of a cure accelerator or promoter added to the resin solution.

The initial resin separation time can also be varied by varying the volume percentage of aromatic hydrocarbons in the solvent. By way of example, there is shown in Table 2 the range over which the initial resin separation time can be varied when varying the volume percentage of aromatics in the solvent. The aromatic component of the solvent consists of the above described kerosene extract; the aromatic content of the solvent is varied by adding gas oil. The solution of which the solvent forms part further contains 12 vol. percent Polyether A, and 3.5 vol. percent 1-cyclohexylamino-3-aminopropane.

The influence of phenol as promoter can be readily seen from Table 2.

TABLE 2

| Volume percent aromatics in solvent | Phenol concentration, grams/liter solution | Initial resin separation time (in hours) | | |
|---|---|---|---|---|
| | | At 40° C. | At 60° C. | At 80° C. |
| 87 | 0 | | | 4.1 |
| 87 | 3 | | 5.0 | 2.5 |
| 87 | 6 | | 3.5 | 1.7 |
| 87 | 10 | 6.5 | 2.6 | 1.2 |
| 87 | 15 | 4.8 | 1.9 | 0.9 |
| 79 | 0 | | 6.3 | 3.5 |
| 79 | 3 | | 4.0 | 2.0 |
| 79 | 6 | 6.5 | 2.8 | 1.3 |
| 79 | 10 | 4.8 | 2.0 | 1.0 |
| 79 | 15 | 3.7 | 1.6 | 0.7 |
| 71.5 | 0 | | 5.0 | 2.7 |
| 71.5 | 3 | 6.5 | 3.2 | 1.7 |
| 71.5 | 6 | 5.1 | 2.2 | 1.2 |
| 71.5 | 10 | 3.7 | 1.6 | 0.8 |
| 71.5 | 15 | 3.4 | 1.3 | 0.6 |

Further, it has been found that compressive strength of permeable mass consolidated according to this invention will be improved when the cured resin is contacted for some time with a washing fluid suitable for extracting solvent occluded in the cured resin. When aromatic hydrocarbons are used as a solvent, it is preferred to use as the washing fluid a hydrocarbon or a mixture of hydrocarbons, such as gas oil, containing no, or only a small amount of aromatic components. If consolidated mass is located around a production well, the crude oil produced from the formation may serve as the washing fluid.

In order to get an indication of the compressive strength of an earth formation surrounding a borehole after consolidation according to this invention, laboratory tests can be carried out wherein the compressive strength of a consolidated mass is determined at the temperature to be expected in the formation. In order to further simulate field conditions in the laboratory, the consolidated mass is treated by a washing fluid before measuring the compressive strength.

In Table 3, there is shown by way of demonstration, the influence of the temperature on the compressive strength of a consolidated mass of heath sand. In the tests a mass of heath sand having a mean particle size of 0.2 millimeter was consolidated by a solution comprising the following components:

|   |   |
|---|---|
| | Vol. percent |
| Curing agent: bis(3-methyl-4-amino-cyclohexyl) methane | 6 |
| Epoxy compound: polyether A | 12 |
| Solvent: | |
|    Kerosene extract | 64 |
|    Gas oil | 17.5 |
| Promoter: phenol | 0.5 |

TABLE 3

| Temperature in ° C. | Compressive strength, kg./cm.² |
|---|---|
| 40 | 292 |
| 60 | 305 |
| 80 | 298 |
| 100 | 220 |

The compressive strength can be increased by increasing the concentration of the epoxy compound in the solution. However, since this will be accompanied by a greater reduction in the permeability of the mass, it will be necessary, when consolidating formations wherein permeability is desired, to find a compromise between the permeability reduction and the compressive strength. In general, this compromise in actual practice of the invention is obtained when the polyepoxide and polyamine components in the resin solution represent from about 5% to 30% by volume of the solution. While greater than 30% by weight can be used, permeability drops off rapidly and, of course, the expense of treatment increases owing to the high cost of the resin components. Therefore in consolidation with this invention, 30% by volume is the upper practical limit.

By way of example, Table 4 shows test results indicating the influence of the concentration of epoxy compound in the solution on the compressive strength and the permeability reduction of a consolidated mass. These tests were carried out by consolidating a mass of heath sand having a mean particle size of 0.2 millimeter by solutions containing the same ingredients as used in the examples of Table 3. In the various solutions the ratio of curing agent to epoxy compound was 0.5.

TABLE 4

| Vol. percent Polyether A in the solution | Compressive strength, kg./cm.² at 60° C. | Permeability reduction, percent |
| --- | --- | --- |
| 3 | 2 | 8 |
| 6 | 54 | 20 |
| 9 | 204 | 30 |
| 12 | 329 | 40 |

A preferred method of practicing the present invention in consolidation of an underground formation is described below by way of example.

In an oil well in which the oil-producing formation consists of an unconsolidated sand, the formation conditions, such as water content, temperature and injectivity, are first measured. Samples of the formation sands are useful for the purpose of determining these factors.

From the pump capacity, the depth of the formation and the injectivity or permeability of the formation, the minimum initial resin separation time, which must be at least equal to the time required to pump the resin solution down into the formation, can be calculated.

The percentages of the epoxy compound, curing agent, promoter, if used, and aromatics to non-aromatics ratio of the solvent are fixed to give an initial resin separation time which, at the temperature of the earth formation, is sufficient to permit pumping the solution down into the formation without encountering separation of resin from the solution.

The required proportions of epoxy compound and curing agent are subsequently dissolved in the solvent at the surface prior to pumping the solution into the formation. The promoter for accelerating the reaction between curing agent and epoxy compound to the desired degree should be mixed with the epoxy compound/curing agent solution just before the solution is pumped into the borehole.

If the formation has a high water saturation, the removal of water is necessary before consolidating the formation. To accomplish this, a quantity of water-removing fluid, followed by a quantity of spacer-fluid, are pumped into the formation before pumping down the resin solution. The necessary quantities of the water-removing fluid can be calculated based on the pore volume of the part of the formation to be consolidated.

A drive fluid is often used to transport the water-removing fluid, the spacer-fluid and the resin solution down to the well and into the formation so that these materials are not left in the piping system and to conserve them.

First of all the water-removing fluid enters the part of the formation to be treated and dissolves or emulsifies the connate water adhering to the grains of the formation. Thereafter, the spacer-fluid drives out the solution or emulsion of water in the water-removing fluid; the spacer-fluid is followed by the resin solution.

As the resin solution should be kept in the part of the formation to be consolidated until the reaction is completed, the injection of the drive fluid is discontinued as soon as all the resin solution has entered the formation. Care should be taken that the solution or part thereof does not remain in the well, as otherwise an impermeable epoxy resin sheath will be formed on the formation face, which will prevent the passage of fluid out of the formation into the well or vice versa. Further, the solution should not be driven too far into the formation, as otherwise those parts of the formation directly surrounding the well will not be consolidated. A suitable drive fluid is one having plastering properties, such as mud slush, as such fluid will form a substantially impermeable sheath on the wall of the formation directly after the resin solution has been forced into the formation, whereby any further displacement of the resin solution in the formation will be prevented. Other suitable drive fluid may be used, e.g., crude oil, other hydrocarbon oils, and the like.

As a result of the reaction between the epoxy compound and the curing agent an intermediate resinous reaction product is precipitated from the solution on the surface of the sand grains, which product on further hardening bonds the individual grains together whereby a consolidated mass is obtained. After the consolidation, the solvent left in the pores of the formation is replaced by a washing fluid which is suitable to extract the solvent occluded in the cured resin. If the well is an injection well, there can be used as a washing fluid a hydrocarbon such as a gas oil containing no, or only a small amount of aromatic compounds. If the well is to be used as a production well, the washing fluid can be constituted by the crude oil present in the formation, by merely bringing the well into production.

Figure 1:
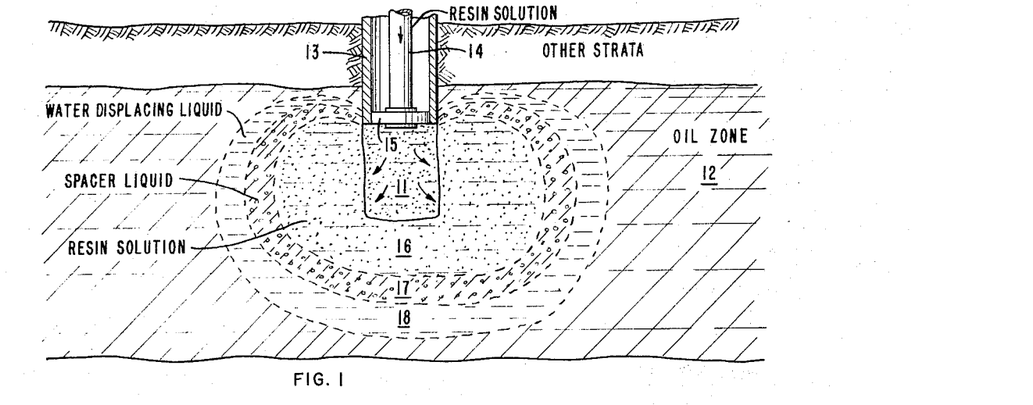
FIGURE 1 is a vertical section through a well borehole diagrammatically illustrating the injection of a resin solution into a formation.

The method of this invention is further illustrated by reference to the drawing. In FIGURE 1, a well borehole 11 is shown which has been drilled through various strata including a formation or formations having an oil producing zone 12. The well casing 13 is shown as positioned in the borehole. Depending within the well casing 13 is the lower end of a production tubing 14 having mounted at the lower end thereof a well packer 15.

After the required preparations have been made as described, a water displacing fluid, e.g., isopropyl alcohol, is first pumped down through tubing 14 and into the oil bearing formation. Following this there is pumped down a spacer liquid consisting of a mixture of aromatic and paraffinic hydrocarbons, capable of dissolving isopropyl alcohol and capable of being dissolved in the resin solution. Lastly there is pumped into the well the prepared resin solution consisting of a mixture of aromatic and paraffinic hydrocarbons, e.g., in the kerosene boiling range, containing dissolved therein an epoxy resin and an amine curing agent of the type described. In order to obtain the desired results said solution is used promptly after it is prepared; the last ingredient added to this solution just before it is pumped into the well tubing is the selected amount of cure accelerator, such as phenol.

FIGURE 1 schematically illustrates a section through the formation while the last part of the resin solution is being pumped down through tubing 14 and into the formation through the lower end of borehole 11. The portion of the oil zone nearest the well borehole has the pores between said grains of the formation filled with resin solution 16. Immediately outside the zone containing the resin solution there is a zone into which the spacer liquid has been displaced and still further out from the bottom of the borehole is a zone now filled with water displacing liquid 18.

After the remaining resin solution has been pumped into the formation, the well is shut in for 24 hours to permit the resin to precipitate from solution and harden on the sand grains of the formation. Thereafter the well is opened, permitting the spacer liquid and water displacing liquid to be withdrawn back into the borehole and up through the tubing, either by virtue of the natural pressure of fluids in the formation or by pumping, as required. The zone 16 which had contained the resin solution is now a consolidated sand, firmly held in place by its resin content. Its strength continues to increase for several days after completion of the treatment, and ultimately reaches a plateau of strength which appears to be permanent.

Figure 2:
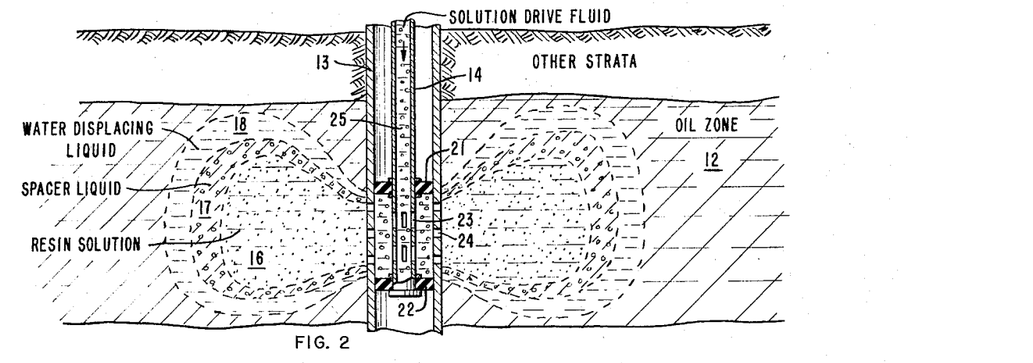
FIGURE 2 is a vertical section through a well borehole illustrating an alternative method of injection of a resin solution into a formation.

FIGURE 2 illustrates a modification of the method of FIGURE 1. In this case a borehole containing well casing 13 traverses oil zone 12. Dependent in the casing is a tubing string 14 which is perforated at the lower end thereof with perforations 23 and which carries straddle packers 21 and 22, capable of isolating a section of the borehole within the oil bearing formation 12. Within said isolated section, the casing is perforated with perforations 24, so that the tubing is in liquid communication with the oil bearing formation.

FIGURE 2 illustrates the situation after water displacing liquid, spacer liquid and resin solution have been pumped down through tubing 14 and into oil zone 12 and the solution drive fluid 25 has just reached the walls of the casing. At this stage, further pumping into the formation is discontinued and the well is shut in for a period such as, for example, 36 hours, to permit the resin to precipitate from the solution and harden on the sand grains of the formation.

Figure 3:
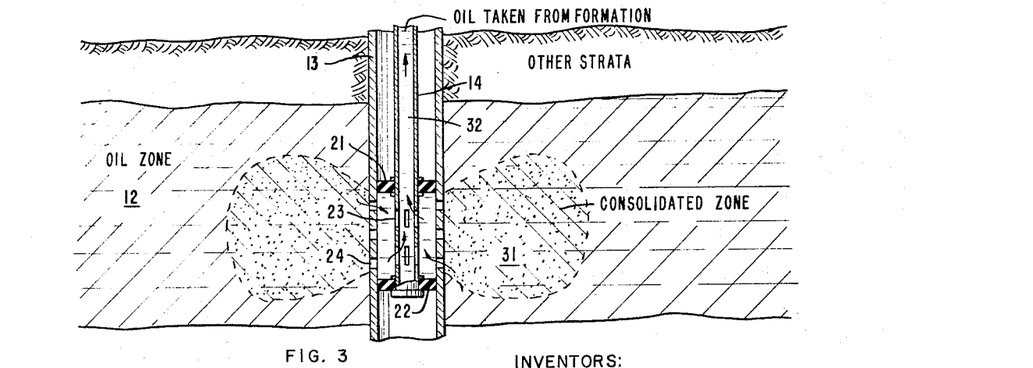
FIGURE 3 is a vertical section through the same well borehole illustrated in FIGURE 2, and illustrates the production of oil from the treated formation.

FIGURE 3 illustrates the same well as FIGURE 2, after the well has been placed in operation. Spacer liquid and water displacing liquid as well as the remaining components of the resin solution have been withdrawn back up through tubing 14 and oil is now being produced from formation 12 and being removed through the tubing. Zone 31 shows the area which had been penetrated by the resin solution. In this area the sand grains which were previously unconsolidated are now firmly bound together by cured resin.

It will be readily apparent that numerous other methods for introducing the required solutions into desired earth formations can be applied. For example, it is sometimes desirable to place a casing string in the borehole, seal the casing string in the borehole along the length of the string passing through the formation to be treated, form a channel through the string and into the permeable section of the formation and then inject the treating solution in the manner previously described through the channel so formed into the permeable formation.

When only a small portion of formation is to be treated, a special tool may be employed in which each solution, i.e., water displacing fluid, spacer fluid, and treating solution, is contained in a separate compartment. The tool is lowered on a wireline to the desired depth, the casing and formation are penetrated if necessary, the solutions are forced from the tool into the formation in the desired sequence, and the well is shut in for the time required for the resin to precipitate and harden. This system permits use of faster acting curing agents than those in which solutions are pumped into the well.

Still other methods of injecting the desired treating solutions into the formation to be treated will occur to the person skilled in the art.

The following illustrates the application of the method of this invention to consolidation of sand surrounding an oil well. The oil producing formation was a clean, well developed, sand stringer in the Miocene N series. An analysis of side wall samples, which are loosely consolidated very fine to fine grain sand, indicates that the sand contains approximately 10% clay, such as kaolinite and montmorillonite. The interval to be consolidated in the well is a 9 foot stringer of which 6 feet is perforated. The bottom hole temperature is 164° F.

Since the well crude oil is not completely soluble in diesel oil, a 50–50 blend of diesel oil and kerosene extract is used as a first wash in the wall treatment to prepare it for consolidation. This blend displaces all the components of the crude. The treatment is designed to consolidate a cylinder 3 feet in radius and 9 feet in depth, the entire thickness of the sand stringer. The sand is first washed with 3 pore volumes of the blend of diesel oil and kerosene extract. This is followed by an equal volume of isopropyl alcohol to remove any remaining water from the formation. A spacer of 1 pore volume of the 50–50 blend is pumped into the formation to separate the alcohol from the resin solution.

Prior to preparing the resin solution, the initial resin separation time for solutions of 12% polyether A and 6% bis(3-methyl-4-aminocyclohexyl)methane in an aromatic solvent with varying amounts of diesel oils and phenol are determined at 164° F. The aromatic solvent is an $SO_2$ extract of kerosene containing about 81% aromatics and having the properties shown in the section entitled "Solvents."

The resin solution is mixed to have an initial resin separation time sufficient to permit it to be pumped into the formation. About 1.1 pore volume of the resin solution is placed into the formation. Care is taken that the resin solution is just displaced into the formation without penetrating too far and without retaining any resin solution in the well bore itself. The well is then shut in for 24 hours for the resin to cure.

When pressure is released on the well, the fluids begin to enter the well immediately and swabbing is not required to bring the well into production. On a 1 hour production test only 0.2% B.S. shakeout is obtained. Although similar sand had been effectively retained by other methods, those wells have produced large amounts of sand during cleanup until bridging occurs. This well produces sand free immediately which is an advantage. In this well as in other wells subsequently treated substantially sand free production has been obtained for several months and there is an indication that the consolidation treatment of this invention will prevent the well from sanding up during its producing life.

We claim as our invention:

1. A method for treating unconsolidated porous earth formation and forming permeable consolidated earth formation, comprising the steps of
   (a) preparing a solution comprising
      (1) a reaction product of a polyepoxide resin and an amine curing agent incorporated into a hydrocarbon solvent consisting of a mixture of aromatic and non-aromatic saturated hydrocarbons capable of maintaining the reaction product in solution for a period of time required to inject said solution into said earth formation and to ensure subsequent separation of the reaction product from said solution,
      (2) the polyepoxide resin having more than one vicinal epoxy group per molecule, and
      (3) the amine curing agent for said polyepoxide resin being present in an amount sufficient to react with at least a portion of the epoxy groups of the resin and the total amount of the reaction product being between 3 and 50 volume percent of the solution,
   (b) injecting said solution into said formation, and
   (c) retaining said solution in said formation for a sufficient time to permit partially cured polyepoxide resin to separate from the solution, deposit on the grains of said unconsolidated porous earth formation, and thereon cure to a hard, cross-linked hydrocarbon insoluble resin and thereby bind the grains of said formation into a consolidated permeable earth formation.

2. A method for treating porous earth formation which contains connate water and which is penetrated by a borehole, comprising the steps of
  (a) preparing a solution which maintains a viscosity below 100 centipoises at least until it enters said formation, said solution comprising
    (1) a reaction product of a polyepoxide resin and an amine curing agent incorporated into a hydrocarbon solvent consisting of a mixture of aromatic and non-aromatic saturated hydrocarbons capable of maintaining the reaction product in solution until it is pumped into the porous formation and to ensure subsequent separation of the reaction product from said solution,
    (2) the polyepoxide resin having more than one vicinal epoxy group per molecule, and
    (3) the amine curing agent for said polyepoxide resin being present in an amount sufficient to react with at least a portion of the epoxy groups of the resin and being capable of preferentially wetting the surface of the grains of the porous earth formation after removal of the connate water therefrom, the total amount of the reaction product being between 5 and 30 volume percent of the solution,
  (b) isolating a zone of said borehole adjacent the formation interval to be treated,
  (c) displacing substantially all unbound water from a portion of said formation interval,
  (d) thereafter pumping said solution into said portion of said formation interval through said isolated zone of said borehole, and
  (e) retaining said solution in said formation for a sufficient time to permit partially cured polyepoxide resin to separate from said solution, deposit on the sand grains of said formation and cure to a hard, cross-linked hydrocarbon insoluble resin.

3. A method for treating porous earth formations by the method of claim 2 wherein the formation being treated is a substantially unconsolidated porous earth formation containing connate water and which is penetrated by a borehole and rendered consolidated and permeable.

4. A method for treating a permeable porous earth formation which contains connate water and which is penetrated by a borehole in fluid communication with the formation, comprising the steps of
  (a) preparing a solution which maintains a viscosity below 100 centipoises at least until it enters said formation, said solution comprising
    (1) a reaction product of a polyepoxide resin and an amine curing agent incorporated into a hydrocarbon solvent consisting of a mixture of aromatic and non-aromatic saturated hydrocarbons capable of maintaining the reaction product in solution until it is pumped into the porous formation and to ensure subsequent separation of the reaction product from said solution,
    (2) the polyepoxide being a normally liquid polyepoxide having more than one vicinal epoxy group per molecule, and
    (3) the amine curing agent for said polyepoxide resin being present in an amount sufficient to react with at least a portion of the epoxy groups of the resin and being capable of preferentially wetting the surface of the grains of the porous formation after removal of the connate water therefrom, the total amount of the reaction product being about 5 and 30 volume percent of the solution,
  (b) isolating a zone of said borehole adjacent the formation interval to be treated,
  (c) pumping into said formation through said isolated zone of said borehole a water displacing fluid,
  (d) thereafter pumping into said formation through said isolated zone of said borehole a spacer fluid which comprises an aromatic hydrocarbon and which is compatible both with said water displacing fluid and said resin solution, and which is non-reactive with said resin solution,
  (e) thereafter pumping said resin solution into said formation through said isolated zone of said borehole, and
  (f) retaining said solution in said formation for a sufficient time to permit partially cured polyepoxide resin to separate from said solution, deposit on said sand grains, and cure to a hard cross-linked hydrocarbon insoluble resin.

5. The method according to claim 4 in which said step (c) of pumping a water displacing fluid into the formation is preceded by the step of pumping into said formation interval through said isolated zone of said borehole a crude-oil-dissolving mixture of diesel oil and kerosene extract.

6. The method according to claim 4 in which said step (f) of retaining said solution in said formation until resin is deposited on the sand grains and cured is followed by the step of pumping into said formation a hydrocarbon washing fluid which is low in aromatics, whereby residual solvent is removed from said cured resin.

7. A method for consolidating an interval of an at least substantially unconsolidated, permeable earth formation which contains connate water, which interval is in fluid communication with a borehole and with an oil-bearing earth formation, comprising the steps of
  (a) preparing a solution which maintains a viscosity below 100 centipoises at least until it enters said formation, said solution comprising
    (1) a reaction product of a polyepoxide resin and an amine curing agent incorporated into a hydrocarbon solvent consisting of a mixture of aromatic and non-aromatic saturated hydrocarbons capable of maintaining the reaction product in solution until it is pumped into the porous formation and to ensure subsequent separation of the reaction product from said solution,
    (2) the polyepoxide resin being the product of the reaction of 2,2-bis(4-hydroxyphenyl)propane and epichlorohydrin in an alkaline medium,
    (3) the amine curing agent being a hydrogenated aromatic polyamine capable of acting as curing agent for said polyepoxide and of rendering the reaction product of preferentially wetting the surfaces of the sand grains of said formation after removal of said connate water, the total amount of polyepoxide resin and amine curing agent being between 5 and 30 volume percent of said solution, and said amine being present in said solution in an amount exceeding by at least 5 mol percent the stoichiometric equivalent of said polyepoxide resin,
  (b) isolating a zone of said borehole adjacent the formation interval to be treated,
  (c) pumping into said formation interval through said isolated zone of said borehole a water displacing fluid,
  (d) thereafter pumping into said formation interval through said isolated zone of said borehole a spacer fluid which comprises an aromatic hydrocarbon and which is compatible both with said water displacing fluid and the solution and is non-reactive with the constituents of said resin solution,
  (e) thereafter pumping said amine solution into said formation interval through said isolated zone of said borehole,
  (f) retaining said solution in said formation for a sufficient time to permit partially cured polyepoxide resin to separate from said solution, deposit on the sand grains of said formation as a thin surface layer and cure to a hard, cross-linked hydrocarbon insoluble resin, and (g) producing oil from said oil-bearing formation through said consolidated formation interval and said borehole.

8. The method according to claim 7 in which said hydrogenated aromatic polyamine is bis-(3-methyl-4-aminocyclohexyl)methane.

9. The method according to claim 7 in which said solution of resin and amine comprises a cure accelerator for said resin.

10. The method according to claim 9 in which said hydrocarbon solvent is an aromatic petroleum extract boiling in the range from 350 to 510° F., said water-displacing fluid is isopropyl alcohol, said spacer fluid is a blend of said aromatic petroleum extract and diesel oil, said curing agent is a polyamine containing at least one cycloaliphatic ring of from 5 to 7 carbon atoms, wherein at least one amino group selected from unsubstituted and ethyl-substituted primary and secondary amino groups is attached directly to a cycloaliphatic ring, and said cure accelerator is phenol.

11. A method for consolidating an interval of an at least substantially unconsolidated, permeable earth formation which contains connate water, which interval is in fluid communication with a borehole and with an oil-bearing earth formation, comprising the steps of (a) preparing a solution which maintains a viscosity below 100 centipoises at least until it enters said formation, comprising (1) a reaction product of a polyepoxide resin and an amine curing agent incorporated into a hydrocarbon solvent consisting of a mixture of aromatic and non-aromatic saturated hydrocarbons boiling in the range of from 350° to 510° F., wherein the ratio of said types of hydrocarbons is capable of maintaining the reaction product in solution for the period of time required to pump said solution into said formation and to ensure subsequent separation of said reaction product from said solution, (2) the polyepoxide being a product of the reaction of 2,2-bis(4-hydroxyphenyl)propane and epichlorohydrin in an alkaline medium, and which has a molecular weight of about 350 to 400, (3) the amine being a polyamine containing at least one cycloaliphatic ring of from 5 to 7 carbon atoms, wherein at least one amino group selected from unsubstituted and ethyl-substituted primary and secondary amino groups is attached directly to a cycloaliphatic ring, the total amount of polyepoxide resin and curing agent being between 5 and 20 volume percent of said solution, and said amine being present in said solution in an amount exceeding by at least 5 mol percent the stoichiometric equivalent of said epoxy resin, (4) a phenolic cure accelerator, (b) isolating a zone of said borehole adjacent the formation interval to be treated, (c) pumping into said formation interval through said isolated zone of said borehole about 3 pore volumes, based on the volume to be treated, of a mixture of diesel oil and aromatic hydrocarbons capable of dissolving connate crude oil, (d) thereafter pumping into said formation interval through said isolated zone of said borehole about 3 pore volumes of isopropanol, (e) thereafter pumping into said formation interval through said isolated zone of said borehole about 1 pore volume of a mixture of diesel oil and aromatic hydrocarbon which is compatible both with said water displacing fluid and said resin solution and is non-reactive with the constituents of said resin solution, (f) thereafter pumping about 1.1 pore volume of said resin solution into said formation interval through said isolated zone of said borehole, (g) retaining said solution in said formation for a sufficient time to permit partially cured epoxy resin to separate from said solution, deposit on the sand grains of said formation as a thin surface layer and cure to a hard, cross-linked hydrocarbon insoluble resin, and (h) producing oil from said oil-bearing formation through said consolidated formation interval and said borehole.

12. The method according to claim 11 in which said amine is bis(3-methyl-4-aminocyclohexyl)methane.

13. The method according to claim 11 in which said amine is a mixture of bis(4-aminocyclohexyl)methane and 1-cyclohexylamine-3-aminopropane.

References Cited by the Examiner

UNITED STATES PATENTS

| | | | |
|---|---|---|---|
| 2,378,817 | 6/1945 | Wrightsman et al. | 166—33 |
| 2,815,815 | 12/1957 | Hower et al. | 166—33 |
| 3,100,527 | 8/1963 | Hilton et al. | 166—33 |

CHARLES E. O'CONNELL, *Primary Examiner.*

T. A. ZALENSKI, *Assistant Examiner.*